Patented Aug. 17, 1943

2,326,756

UNITED STATES PATENT OFFICE 2,326,756

KETONES OF THE CYCLOPENTANO-POLY-HYDROPHENANTHRENE SERIES AND A METHOD OF PRODUCING THE SAME

Adolf Butenandt, Berlin-Dahlem, Hans Herloff Inhoffen, Berlin - Wilmersdorf, and Hans Dannenbaum, Falkenhain - Finkenkrug, near Berlin, Germany, assignors to Schering Corporation, Bloomfield, N. J., a corporation of New Jersey No Drawing. Application April 18, 1939, Serial No. 268,519. In Germany April 21, 1938

19 Claims. (Cl. 260—397.5)

This invention relates to new ketones of the cyclopentano-polyhydrophenanthrene series and a process of making the same.

In U. S. Patent No. 2,150,885, issued to Walter Schoeller and Arthur Serini there is described a process for the manufacture of cyanhydrins of compounds of the aetiocholane series, according to which saturated or unsaturated aetiocholanones or aetio-allo-cholanones are brought into reaction with hydrocyanic acid or agents giving off hydrocyanic acid. By this means for example from dehydroandrosterons or its derivatives in which the hydroxyl group is converted into a group reconvertible into this group, a compound of the formula:

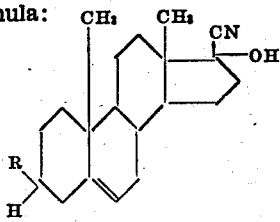

is obtained in which R is hydroxyl or a substituent convertible into the hydroxyl group, which therefore contains in 17-position together with the cyano group also a further hydroxyl group.

In accordance with the present invention it is possible from such compounds containing the cyanhydrin grouping and saturated or unsaturated in the ring, to split off one molecule of water and thus to produce nitriles unsaturated in the cyclopentane ring.

The splitting off of water from the cyanhydrins is effected by the action of agents capable of splitting off water. In particular for this purpose there has proved suitable the application of phosphorus oxyhalide in a suitable solvent capable of binding halogen hydride such as pyridine and the like.

From such unsaturated nitriles it is possible by reaction with organo-metal compounds primarily such of the formula:

R—Me$^{II}$ Halg. or R—Me$^{I}$ to produce valuable compounds in which the cyano group is replaced by a —CO—R group. In the formulae given R indicates any organic radicle as for example unsubstituted or substituted hydrocarbon residues such as alkyl and in particular methyl, hydroxy-alkyl, or groups convertible thereinto such as alkoxy- or acyloxy-alkyl, unsaturated aliphatic hydrocarbon residues such as alkenyl or alkinyl and the like, Me$^{II}$ or Me$^{I}$ stands for di- or mono-valent metals applicable for Grignard reactions, as for example magnesium, zinc, alkali metals such as lithium and the like, the application of magnesium being particularly suitable, and Halg. is a halogen, as for example bromine or iodine.

In the reaction with the organo-metal compound, there are produced primarily the corresponding ketimines of the general formula

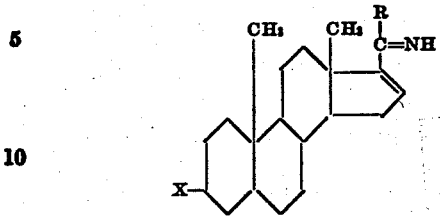

the ring system being saturated or unsaturated, wherein X is a member of the group consisting of

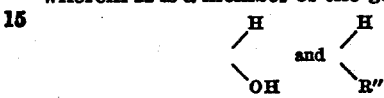

R'' being a group convertible into a hydroxyl-group, and R is a member of the group consisting of saturated and unsaturated hydrocarbon residues. These ketimines are saponified to the ketones for example by heating with inorganic or organic acids, for example alcoholic sulphuric acid, glacial acetic acid, dilute acetic acid and the like.

The compounds unsaturated in the cyclopentane ring thus obtained, which can contain in the ring system still further double bonds, are then partially hydrogenated and if desired oxidised.

For the partial hydrogenation the known processes for the adding on of hydrogen to double bonds are suitable; in particular it is to be recommended to employ catalytically activated hydrogen, in which case the hydrogenation is suitably carried out in the presence of catalysts of mild action, in particular activated nickel catalysts, as for example Raney-nickel, suitably at ordinary pressure and ordinary temperature in neutral or weakly alkaline medium; however, in some cases also noble metals can be employed as catalysts, as for example palladium, platinum black and the like.

Of particular importance in the process of the present invention is the application of methyl or hydroxy-methyl organo-metal compounds on the one hand and of the cyanhydrins of dehydroandrosterone or its esters on the other hand, since in this manner compounds are obtained which contain in the side chain the grouping

—CO—CH$_3$ or —CO—CH$_2$OH and therefore indicate the synthesis of the corpus luteum hormone or of corticosterone from a male hormone of the androstane series. Thus with the application of the cyanhydrin of dehydroandrosterone acetate and methyl magnesium iodide the free Δ$^{5,16}$-pregnadienol-3-one-20 is obtained, since in carrying out the reaction for the most part simultaneously a saponification of the ester takes place. The said compound can by partial hydrogenation be converted without difficulty into the Δ5-singly unsaturated compounds (pregnenolone or pregnendiol) and by subsequent oxidation, if desired with protection of the double bond present, for example according to the process of U. S. specifications Serial No. 34,599, Serial No. 267,182 and Serial No. 267,184 into the pregnendione-3,20.

Likewise by the application of the cyanhydrin of dehydroandrosterone or its esters and hydroxymethyl magnesium halides or suitably their ethers, Δ5,16-pregnadiendiol-3.21-one-20 is obtained which by partial hydrogenation, for example by means of Raney-nickel, is converted into the Δ5-singly unsaturated compound which can now be oxidised according to the process of the specifications set forth above, for example by means of the process of exchange of oxidation stages, likewise to the 21-hydroxy-pregnendione-3,20.

It is naturally also possible to arrive at the same compounds when the nitriles unsaturated in the cyclopentane ring obtained by splitting off of water are first partially hydrogenated and the said organo-metal compounds allowed to react on the compounds saturated in the cyclopentane ring thus obtained.

The reaction may be illustrated by the following scheme of formulae which indicates the conversion of dehydroandrosterone cyanhydrin acetate-3 into pregnendione-3,20.

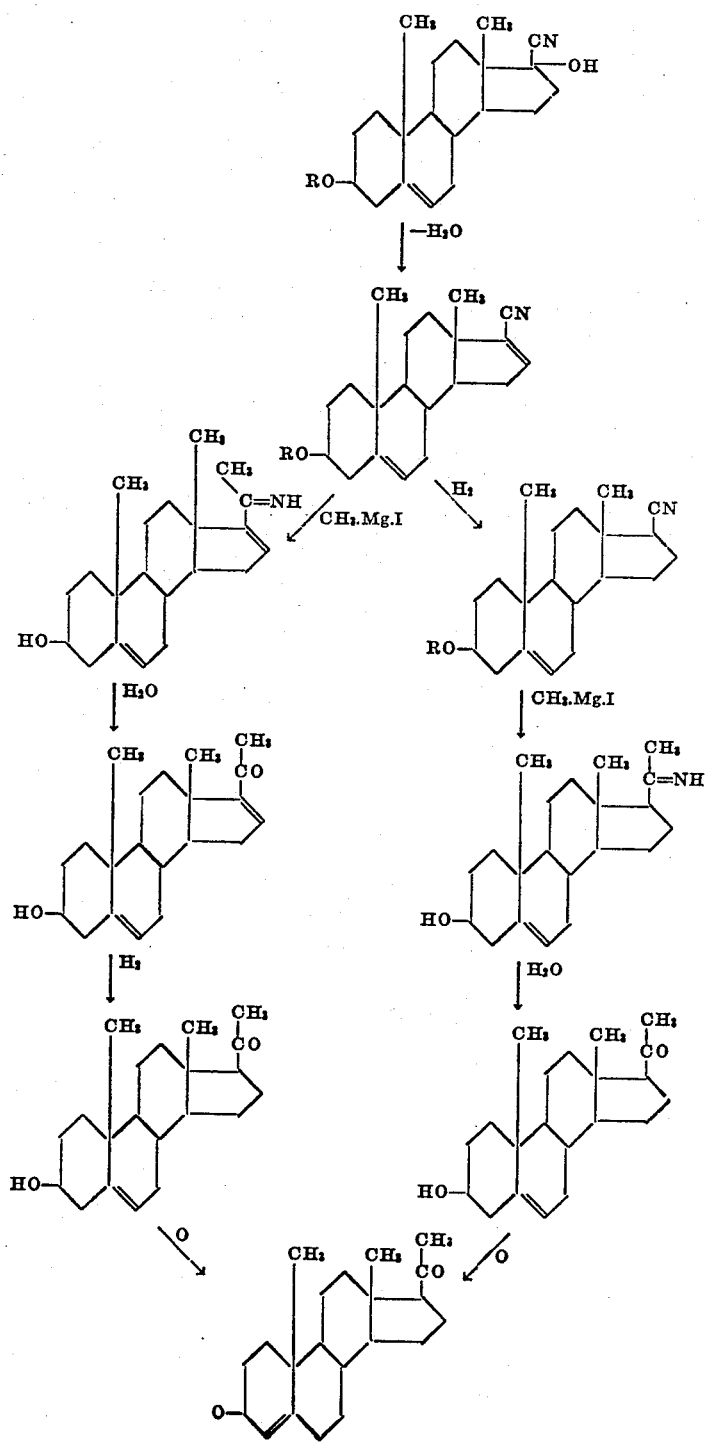

The following examples illustrate the invention:

Example 1

2 grams of dehydroandrosterone-cyanhydrin acetate mixture are boiled in a mixture of 20 ccs. of pyridine with 5 ccs. of phosphorus oxychloride for 10 minutes. Thereupon the whole is cooled and carefully introduced drop by drop into ice water which contains the necessary quantity of hydrochloric acid (about 20 ccs. of concentrated hydrochloric acid) for neutralisation of the pyridine. The decomposition of the excess reagent takes place very violently. The deposited precipitate is filtered off, washed with water and dried by suction. It is dissolved in pyridine, the solution boiled and thereupon sprayed with hot water until crystallisation commences. Beautiful long needles crystallise which are to some extent still contaminated by a difficultly soluble secondary product. The product is dissolved in acetone, the difficulty soluble secondary product filtered off and the solution sprayed with water to the point of crystallisation. Yield 1.1 grams. The product exhibits after recrystallisation from dilute acetone or from ethyl acetate a melting point of 21° C. Since the water splitting product of the cyanhydrin acetate (3) tenaciously retains solvent in the crystal, it is sublimed in a water pump vacuum at 210° C. Only by this means are correct analytical results obtained. The U. V.-absorption commences at 240 m$\mu$ and rises towards shorter wave lengths.

750 mg. of water splitting product are dissolved in 50 ccs. of absolute ether and the solution introduced drop by drop into a boiling Grignard solution from 2.2 grams Mg.+5.5 ccs. CH$_3$I in 10 ccs. of absolute ether. The reaction mixture is heated for 6 hours to boiling and thereupon poured into water, acidified with hydrochloric acid and extracted with ether. The ether is washed with sodium bisulphite solution to decolorisation by removal of separated iodine, washed with water, dried and distilled. The residue is boiled in 7.5 ccs. of alcohol with 0.4 cc. of concentrated sulphuric acid for 15 minutes to the splitting of the ketimine. The solution is poured into water and the deposited precipitate filtered off. Recrystallised from alcohol the pregnadienol-3-one-20 is obtained in a yield of 90 mg. From dilute alcohol crystallise leaflets of M. P. 128° C. The U. V.-absorption spectrum possesses a maximum at 234 m$\mu$. The oxime of the product obtained melts at 215° C. with decomposition.

Example 2

400 mg. of dehydroandrosterone-cyanhydrin acetate-(3) (mixture of isomers) are heated in a mixture of 10 ccs. of pyridine and 0.15 cc. of phosphorus oxychloride (about double the theoretical quantity) in a sealed tube for 1½ hours to 150° C. The dark brown but still transparent solution is poured into a mixture of ice and 40 ccs. of concentrated hydrochloric acid and the precipitate produced filtered off. It is dissolved in acetone and separated from insoluble dark coloured flocks by filtration. After the concentration of the solution and spraying with water there crystallise 300 mg. of 17-cyano-3-acetoxy-$\Delta_5.\Delta_{16}$-androstadiene of M. P. 206° C. The yield amounts to 79% of the theory.

To 5 grams of magnesium turnings under 20 ccs. of absolute ether to which for activation a few grains of iodine are added, with ice cooling methyl bromide (cooled in a freezing mixture) is gradually added until the dissolving of the metal which commences after some time is almost complete. The completion of the reaction is effected by a few minutes' heating to boiling. The boiling Grignard solution is then treated with a solution of 1.8 grams of 17-cyano-3-acetoxy-$\Delta_5.\Delta_{16}$-androstadiene and maintained boiling for 46 hours. For decompositions of the Grignard product, under reflux and with external cooling slowly 60 ccs. of glacial acetic acid are introduced and after completion of the violent reaction about 40 ccs. of water. The ether is distilled out of the mixture and the aqueous glacial acetic acid solution treated with so much water that the turbidity first produced in the hot just disappears again. For splitting of any not yet hydrolysed ketimines the whole is again heated to boiling for 15 minutes. After cooling the whole is poured into water. The precipitate product yields on recrystallisation from acetone 1.26 grams of crude product in leaflets of M. P. 212° C. (75% of the theory). This is recrystallised from ethyl acetate whereby the $\Delta_5.\Delta_{16}$-pregnadienol-3-one-20 is obtained in small prismatic needles which melt at 216° C. with yellow coloration.

The ultra-violet absorption curve exhibits the characteristic maximum for $\alpha$-$\beta$-unsaturated ketones at 237 m$\mu$.

500 mg. of pregnadienolone are dissolved in 5 ccs. of dry cyclohexanone, a solution of 700 mg. of freshly distilled aluminium isopropylate in 30 ccs. of toluene introduced and the mixture heated to boiling for 45 minutes. After the addition of water the cyclohexanone and the toluene are driven off with steam. The aqueous solution is extracted with ether without taking account of separated aluminium hydroxide. The crystalline residue remaining after evaporation of the ether gives when recrystallised from acetone 380 mg. of crude product of M. P. 175° C. It still contains unchanged starting material. For the removal thereof it is dissolved in 15 ccs. of dry chloroform and treated with 5 ccs. of pyridine and with ice cooling with a cooled mixture of 1.5 ccs. of chlorsulphonic acid and 6 ccs. of chloroform. The reaction mixture is heated to boiling for 15 minutes without taking account of any deposited crystalline precipitate thereby produced. Thereupon a solution of 8 grams of sodium carbonate in 20 ccs. of water is added and the mixture extracted with ether. After filtering off insoluble salts the ether solution is washed with dilute sulphuric acid and water. After distilling off the solvent, from aqueous acetone 235 mg. of 16-dehydroprogesterone are obtained in leaflets of M. P. 186° C. After recrystallisation from ethyl acetate it exhibits a melting point of 186–188° C. Since the crystals retain water of crystallisation tenaciously the pure substance is sublimed in a water pump vacuum at 210–220° C.

The ultra-violet absorption spectrum of the 16-dehydroprogesterone exhibits a maximum at 234 m$\mu$. 300 mg. of pregnadienolone are dissolved in 20 ccs. of alcohol and hydrogenated with the addition of 0.15 gram of caustic soda solution in 3 ccs. of water with Raney-nickel up to saturation. After filtering off the catalyst the solution is poured into water. The deposited precipitate is filtered off and gives after recrystallisation from aqueous acetone 260 mg. of $\Delta_5$-pregnenolone as crude product of M. P. 181° C. By recrystallisation from aqueous alcohol pure $\Delta_5$-pregnenol-(3)-one-20 is obtained in leaflets of M. P. 188–190° C. which gives no depression in a mixed melting point test with pregnenolone obtained from stigmasterol.

Example 3

A solution of 0.4 gram of 17-cyano-$\Delta_{5.6:16.17}$-androstadienol-3 acetat obtained for instance, according to Example 1, in 50 ccs. of ether is added drop by drop within half an hour to a boiling Grignard solution from 0.6 gram of magnesium activated with mercury, 3 grams of chloromethyl-ether and 30 ccs. of ether. The reaction mixture is heated to boiling for 6 hours and thereupon washed with dilute sulphuric acid, sodium triosulphate solution, sodium carbonate solution and water. The reaction product obtained after the evaporation of the ether is boiled with a mixture of 8 ccs. of alcohol and 0.4 cc. of concentrated sulphuric acid for 15 minutes, the solution then poured into water and the precipitate filtered with suction. The 21-methyl-ether of the 21-hydroxy-pregnadienol-3-one-20 thus obtained is split in known manner whereby the free pregnadiendiol-3.21-one-20 is obtained.

Example 4

0.5 gram of the doubly unsaturated 3-acetoxy-17-cyano-$\Delta_{5.16}$-androstradiene obtained, for instance, according to Example 2, is dissolved in 100 ccs. of absolute alcohol, treated with 1 cc. of 5% methyl alcoholic caustic potash solution and shaken with 80 mg. of a nickel catalyst according to Raney previously saturated with hydrogen, until the quantity of hydrogen corresponding to about 1 mol is taken up. Then the catalyst is filtered off, thoroughly washed with alcohol and the combined solutions exactly neutralized with glacial acetic acid, evaporated in vacuum and dried. The residue is immediately brought into solution with 20 ccs. of hot pyridine and, without taking account of insoluble salt residues, treated with 10 ccs. of distilled acetic anhydride in order to reverse any de-esterifications which may have taken place during the alkaline hydrogenation. After 12 hours standing at room temperature the whole is decomposed in known manner with ice and dilute hydrochloric acid, exhaustively extracted with ether and the evaporation residue of the carefully washed and dried ether taken up in 15 ccs. of benzene. This solution is treated with 150 ccs. of pure hexane and filtered through a column of 25 grams of standardised aluminum oxide. By exhaustive washing with (a) pure hexane, (b) pure benzene and (c) a mixture of benzene with 3% of ethanol, there are produced three correspondingly designated fractions of which (a) (=25.8 mg.) constitutes any unchanged doubly unsaturated starting material, (b) (=321.6 mg.) is analytically pure 16.17 saturated 3-acetoxy-17-cyano-$\Delta_5$-androstene (referred to below for brevity as "hydronitrile") of M. P. 197–212° C. and the specific rotation $[\alpha]_D^{20}=-45°$; (b) is to be considered as a mixture of the two theoretically possible forms epimeric on $C_{17}$, its composition can accordingly vary somewhat around the specified values. Fraction (c) constitutes a mixture of epimeric acetylated amines (=3-acetoxy-17-acet-amino-methyl-5-androstene), which are produced by over-hydrogenation and can easily be separated in the manner set forth. (Yield of c=147 mg.)

Example 5

2.5 grams of magnesium turnings, 10 ccs. of absolute ether and a grain of iodine are mixed with exclusion of moisture and with ice cooling and gradually treated with so much distilled strongly cooled methyl bromide that the metal is dissolved; the reaction is completed by short heating. The weakly boiling solution is now gradually treated with 0.9 gram of "hydronitrile" dissolved in 20 ccs. of absolute ether and thereupon maintained boiling for a further 54 hours. Thereupon it is cooled with ice, the solution decomposed with intensive stirring by the addition drop by drop of first 30 ccs. of glacial acetic acid then 20 ccs. of distilled water and finally the ether distilled off by gentle heating. With further stirring so much water is added that the solution just clears and by heating to boiling for 15 minutes the residue of difficultly decomposable ketimines is split up to ketones. By pouring into ten times the quantity of water and exhaustive extraction with ether 0.6 gram of crude pregnenolone is obtained which can be purified by repeated recrystallization from acetone-water with intermediate purification with animal charcoal to the known melting point of 188–190° C. The pregnenolone thus produced can be oxidised in known manner to the progesterone.

What we claim is:

1. Process for the manufacture of ketones of the cyclopentanopolyhydrophenanthrene series, comprising splitting off the elements of water from a cyclopentanopolyhydrophenanthrene compound containing in 17-position the cyanhydrin grouping to form the corresponding $\Delta_{16}$-17-cyano compound, reacting the latter with an organo-metallic compound capable of adding on the organic radical to the 20-carbon to form the ketimine compound, hydrolyzing the ketimine, and hydrogenating the 16,17 double bond.

2. Process as claimed in claim 1, wherein the organo-metallic compound is selected from the group consisting of $$R\text{---}Me^{II}\text{ Halg. and } R\text{---}Me^{I}$$

in which R indicates a member of the class consisting of hydrocarbon radicals, hydroxylated hydrocarbon radicals, and groups convertible into hydroxylated hydrocarbon radicals with the aid of hydrolysis, $Me^{II}$ and $Me^{I}$ stand respectively for di- and mono-valent metals capable of being joined directly to the carbon of organic radicals, and Halg. is a halogen.

3. Process as claimed in claim 1, wherein the organo-metallic compound is selected from the group consisting of $$R\text{---}Me^{II}\text{ Halg. and } R\text{---}Me^{I}$$

in which R indicates a saturated aliphatic hydrocarbon radical, $Me^{II}$ and $Me^{I}$ stand respectively for di- and mono-valent metals capable of being joined directly to the carbon of organic radicals, and Halg. is a halogen.

4. Process as claimed in claim 1, wherein the organo-metallic compound is selected from the group consisting of $$R\text{---}Me^{II}\text{ Halg. and } R\text{---}Me^{I}$$

in which R indicates a member of the class consisting of hydroxyalkyl radical, and $Me^{II}$ and $Me^{I}$ stand respectively for di- and mono-valent metals capable of being joined directly to the carbon of organic radicals, and Halg. is a halogen.

5. Process as claimed in claim 1, wherein a Δ16,17-unsaturated nitrile (17) of the cyclopentanopolyhydrophenanthrene series is caused to react with an organo-metallic halide in which the metal is attached directly to a carbon atom.

6. Process as claimed in claim 1, wherein the metal of the organo-metallic compound belongs to the class consisting of magnesium, zinc and lithium.

7. Process as claimed in claim 1, wherein a member of the group consisting of dehydroandrosterone and 3-acyl-compounds thereof, containing in the 17-position the cyanhydrin grouping, is employed.

8. Process as claimed in claim 1, wherein a member of the group consisting of the cyanhydrins of dehydroandrosterone and of the 3-acyl-compounds thereof, is employed as starting material, the doubly unsaturated nitrile produced reacted with a methyl-organo-metallic compound capable of adding on the organic radical to the 20-carbon, and after splitting of the ketimine, the pregnadienol-3-one-20 so obtained is partially hydrogenated to saturate the cyclopenteno ring, and the product oxidized to pregnendione-3.20.

9. Process as claimed in claim 1, wherein a member of the group consisting of the cyanhydrins of dehydroandrosterone and of the 3-acyl-compounds thereof is employed as starting material, the doubly unsaturated nitrile produced reacted with a hydroxy-methyl-organo-metallic compound capable of adding on the organic radical to the 20-carbon, and after splitting of the ketimine, the pregnadiendiol-3.21-one-20 so obtained is partially hydrogenated to saturate the cyclopenteno ring, and the product oxidized and saponified to pregnenol-21-dione-2.20.

10. Process as claimed in claim 1, wherein the water-splitting from the cyanhydrin is effected by heating with a phosphorus oxyhalide in a halogen hydride-binding solvent.

11. Process as claimed in claim 1, wherein the reaction of the unsaturated nitrile obtained by water-splitting takes place with a methyl magnesium iodide.

12. Modification of the process claimed in claim 1, wherein the nitrile unsaturated in the cyclopentane ring obtained by water-splitting from the cyanhydrin is partially hydrogenated to saturate such ring, and thereafter the reaction product reacted with an organo-metallic compound of the Grignard type.

13. Steroid ketimines of the general formula

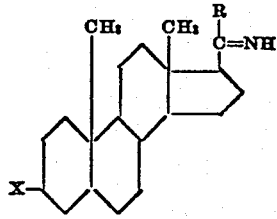

wherein X is a member of the group consisting of

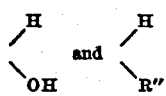

R" being a group convertible with the aid of hydrolysis into a hydroxyl group, and R is a member of the group consisting of saturated and unsaturated hydrocarbon radicals.

14. Steroid 20-ketimine of the general formula

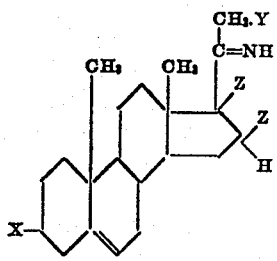

wherein X is a member of the group consisting of

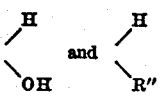

R" being a group convertible with the aid of hydrolysis into a hydroxyl group, and Y is a member of the class consisting of hydrogen, hydroxyl and a group convertible by hydrolysis into a hydroxyl group, while Z, Z together represent a member of the group consisting of two hydrogen atoms and a carbon to carbon double bond.

15. Process as claimed in claim 19, in which the cyanhydrin of a member of the group consisting of dehydroandrosterone and the 3-acyl compounds thereof is employed as starting material, the doubly unsaturated nitrile produced reacted with an ether of a hydroxy-methyl-metallic compound capable of adding on the organic radical to the 20-carbon, and after splitting of the ketimine of the ether of the pregnadiene-diol-3,21-one-20 so obtained, the product is partially hydrogenated to saturate the cyclopentano ring, and the product oxidized, and then saponified to pregnenol-21-dione-3,20.

16. Process as claimed in claim 19, in which the cyanhydrin of a member of the group consisting of dehydroandosterone and the 3-acyl compounds thereof is employed as starting material, the doubly unsaturated nitrile produced reacted with the methyl ether by a hydroxy-methyl-metallic compound capable of adding on the organic radical to the 20-carbon, and after splitting of the ketimine of the methyl ether of pregnadiene-diol-3,21-one-20 so obtained, the product is partially hydrogenated to saturate the cyclopentano ring, the product oxidized to the 3,20-dione, and saponified to pregnenol-21-dione-3,20.

17. Process for the manufacture of ketones of the cyclopentano polyhydro phenanthrene series, wherein a steroid compound containing a hydroxy-free 17-position to which is attached a nitrile group, is reacted with an organo-metallic compound capable of adding on the organic radical to the 20-carbon to form a ketimine, and thereafter the ketimine is split to form the corresponding ketone.

18. Process for the manufacture of ketones of the cyclopentano polyhydro phenanthrene series, wherein a steroid compound containing a hydroxy-free 17-position to which is attached a nitrile group and containing a double bond between the 16 and 17 positions, is reacted with an organo-metallic compound capable of adding on the organic radical to the 20-carbon to form a ketimine, and after splitting of the ketimine, the unsaturated pregnane compound produced is partially hydrogenated to saturate the cyclopentano ring.

19. Process for the manufacture of 10,13-dimethyl cyclopentano polyhydro phenanthrene compounds having a —CO.CH₃ group in the 17- position, comprising reacting a dehydroandrosterone compound having in the 3-position a member of the class consisting of hydroxyl and groups convertible thereinto with the aid of hydrolysis, and having a nitrile group in the 17-position and a double bond in the 16,17-position with a methyl-metal compound capable of adding on the organic radical to the 20-carbon, to form the corresponding ketimine, and thereafter, and in any order, splitting the resulting product and partially hydrogenating the same to form the corresponding 20-keto cyclopentano compound, and replacing the group in the 3-position with a keto group.

ADOLF BUTENANDT.
HANS HERLOFF INHOFFEN.
HANS DANNENBAUM.

CERTIFICATE OF CORRECTION.

Patent No. 2,326,756.　　　　　　　　　　　　　　　August 17, 1943.

ADOLF BUTENANDT, ET AL.

It is hereby certified that error appears in the printed specification of the above numbered patent requiring correction as follows: Page 4, second column, line 71-72, claim 4, strike out the words "member of the class consisting of--; page 5, first column, line 38, claim 9, for "pregneol-21-dione-2.20" read --pregneol-21-dione-3.20--; page 5, second column, lines 26 and 39, claims 15 and 16 respectively, for the claim reference numeral "19" read --1--; line 44, claim 16, for "by" read --of--; and that the said Letters Patent should be read with this correction therein that the same may conform to the record of the case in the Patent Office.

Signed and sealed this 19th day of October, A. D. 1943.

(Seal)

Henry Van Arsdale,
Acting Commissioner of Patents.